US012631994B2

(12) United States Patent
Someya et al.

(10) Patent No.: US 12,631,994 B2
(45) Date of Patent: May 19, 2026

(54) HEATING DEVICE, FIXING DEVICE, IMAGE FORMING APPARATUS, LAMINATOR, AND THERMOCOMPRESSION DEVICE WITH A GAP BETWEEN A TEMPERATURE DETECTOR AND A THERMAL CONDUCTOR

(71) Applicants: Yukimichi Someya, Saitama (JP);
Hiroyuki Shimada, Tokyo (JP);
Yuusuke Furuichi, Kanagawa (JP)

(72) Inventors: Yukimichi Someya, Saitama (JP);
Hiroyuki Shimada, Tokyo (JP);
Yuusuke Furuichi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/773,593

(22) Filed: Jul. 16, 2024

(65) Prior Publication Data

US 2025/0028267 A1     Jan. 23, 2025

(30) Foreign Application Priority Data

Jul. 20, 2023     (JP) ................................. 2023-118227

(51) Int. Cl.
G03G 15/20     (2006.01)
B41J 11/00     (2006.01)
B65B 51/16     (2006.01)
B32B 37/00     (2006.01)
B65B 51/10     (2006.01)

(52) U.S. Cl.
CPC .... G03G 15/2053 (2013.01); B41J 11/00242 (2021.01); B65B 51/16 (2013.01); G03G 15/2039 (2013.01); G03G 15/2064 (2013.01); *B32B 37/0053* (2013.01); *B32B 2037/0061* (2013.01); *B65B 2051/105* (2013.01); *G03G 2215/2016* (2013.01)

(58) Field of Classification Search
USPC ........................................................ 399/329
See application file for complete search history.

(56) References Cited

U.S. PATENT DOCUMENTS

2014/0138372 A1     5/2014     Ogura
2015/0227091 A1*    8/2015     Ando ................. G03G 15/2046
                                                                 399/33

FOREIGN PATENT DOCUMENTS

JP          2014-102429 A      6/2014
JP          2022189098 A   * 12/2022    ......... G03G 15/2053

* cited by examiner

*Primary Examiner* — Quana Grainger
(74) *Attorney, Agent, or Firm* — XSENSUS LLP

(57)          ABSTRACT

A heating device including, an endless belt, a heater, a temperature detector, a high thermal conductor including a hole or a notch, a holder restricts a movement of the high thermal conductor in at least at a downstream of the first direction, a first gap along the first direction formed between an upstream surface in the first direction of the temperature detector and an upstream surface in the first direction of the hole or the notch of the high thermal conductor, a second gap along the first direction formed between a downstream surface in the first direction of the high thermal conductor and a downstream surface in the first direction of the housing portion, wherein a size A of the first gap and a size B of the second gap satisfy a relationship of A>B.

20 Claims, 10 Drawing Sheets

HEATING DEVICE, FIXING DEVICE, IMAGE FORMING APPARATUS, LAMINATOR, AND THERMOCOMPRESSION DEVICE WITH A GAP BETWEEN A TEMPERATURE DETECTOR AND A THERMAL CONDUCTOR

CROSS-REFERENCE TO RELATED APPLICATION

This patent application is based on and claims priority pursuant to 35 U.S.C. § 119(a) to Japanese Patent Application No. 2023-118227, filed on Jul. 20, 2023, in the Japan Patent Office, the entire disclosure of which is hereby incorporated by reference herein.

BACKGROUND

Technical Field

Embodiments of the present disclosure generally relate to a heating device, a fixing device, and an image forming apparatus.

Background Art

As an example of a heating device, in a fixing device mounted on an image forming device such as a copying machine or a printer, a recording medium such as a paper is transported to a fixing nip between a fixing belt as a fixing member and a pressing roller as a pressing member, and the recording medium is pressurized and heated, so that an unfixed image on the recording medium is fixed to the recording medium.

In general, the fixing device includes a pair of rotating bodies that are in contact with each other to form a nip portion, a heating source that heats at least one of the pair of rotating bodies, and the like. When the sheet enters between the rotating bodies (e.g., nip portion) in a state in which one or both of the rotating bodies are heated to a predetermined temperature by the heating source, the unfixed image on the sheet is heated and pressed, and the unfixed image is fixed to the sheet. In addition, in the fixing device, a temperature sensor that detects the temperature of the heating source is used in order to appropriately maintain the temperature of the heating source and prevent an excessive temperature rise.

The temperature sensor is preferably arranged in direct contact with the heating source in order to detect the temperature of the heating source with excellent responsiveness. For example, Japanese Unexamined Patent Application Publication No. 2014-102429 discloses a configuration in which a temperature sensor is disposed in a portion where a graphite sheet is cut out, and the temperature sensor is brought into direct contact with a heater.

However, due to such positional deviation of the parts, when the cut-out portion of the graphite sheet contacts the temperature sensor, since the heat transmitted from the temperature sensor to the graphite sheet, it may lead to delay the response of the temperature sensor by not detecting quick and accurate temperature.

Therefore, an object of the present disclosure is to ensure excellent responsiveness of a temperature sensor.

SUMMARY

According to embodiments of the present disclosure, a heating device including, an endless belt, a heater, a temperature detector, a high thermal conductor including a hole or a notch, a holder restricts a movement of the high thermal conductor in at least at a downstream of the first direction, a first gap along the first direction formed between an upstream surface in the first direction of the temperature detector and an upstream surface in the first direction of the hole or the notch of the high thermal conductor, a second gap along the first direction formed between a downstream surface in the first direction of the high thermal conductor and a downstream surface in the first direction of the housing portion, wherein a size A of the first gap and a size B of the second gap satisfy a relationship of A>B is described.

According to the present disclosure, excellent responsiveness of the temperature sensor can be ensured.

BRIEF DESCRIPTION OF THE SEVERAL VIEWS OF THE DRAWINGS

A more complete appreciation of the embodiments and many of the attendant advantages and features thereof can be readily obtained and understood from the following detailed description with reference to the accompanying drawings.

Figure 1:
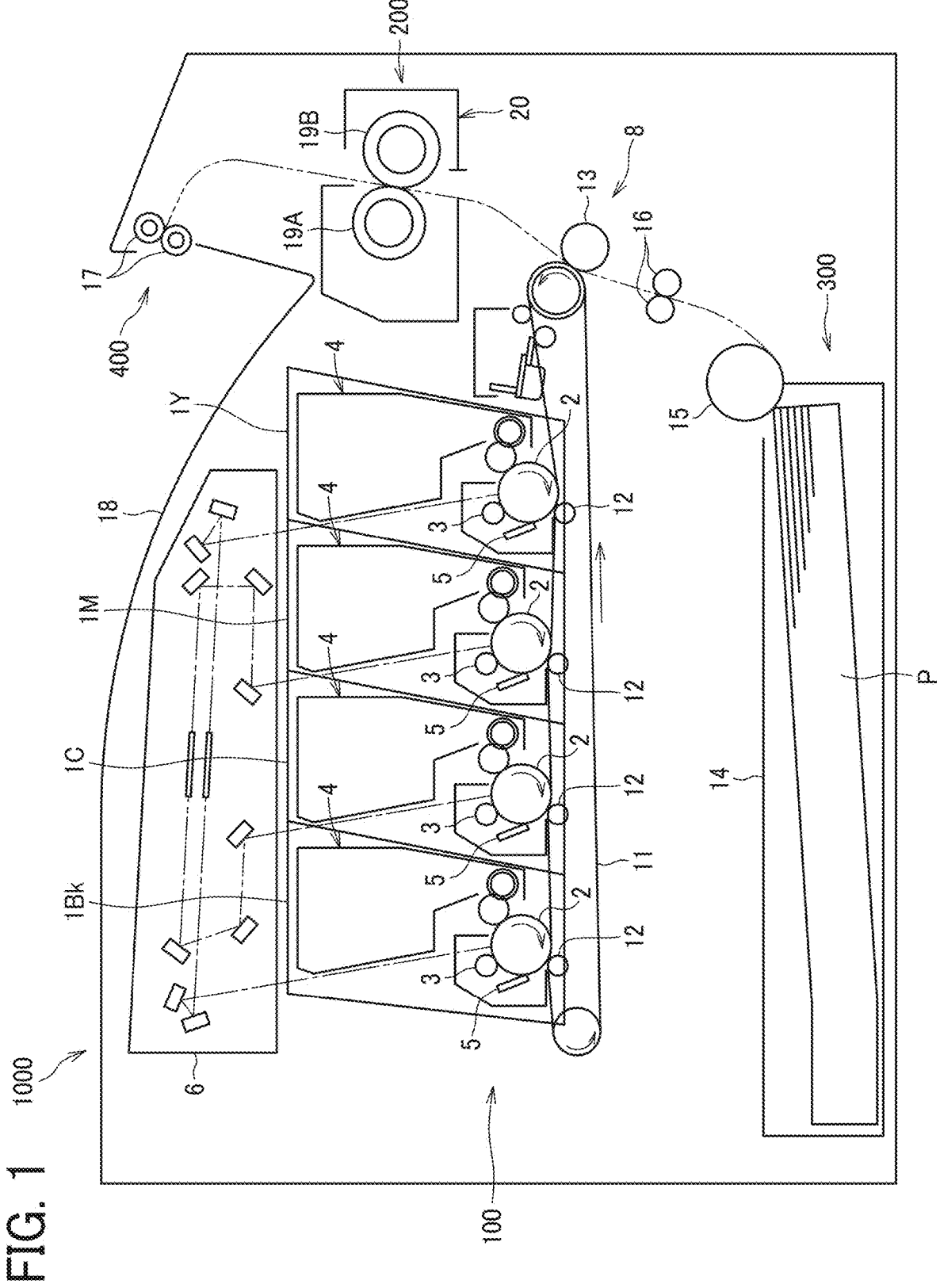
FIG. 1 A schematic configuration diagram of an image forming apparatus.

The accompanying drawings are intended to depict examples and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to the accompanying drawings, descriptions are given below of embodiments of the present disclosure. In the drawings for illustrating embodiments of the present disclosure, like reference signs denote like elements, and overlapping description may be simplified or omitted as appropriate.

FIG. 1 is a schematic diagram of a configuration of an image forming apparatus 1000 according to an embodiment of the present disclosure. In the following description, the "image forming apparatus" includes a printer, a copier, a facsimile machine, or a multifunction peripheral having at least two of printing, copying, scanning, and facsimile functions. "Image formation" means the formation of images with meanings such as characters and figures and the formation of images with no meanings such as patterns. Initially, with reference to FIG. 1, a description is given below of the overall configuration and operation of an image forming apparatus 1000 according to the present embodiment.

As illustrated in FIG. 1, the image forming apparatus 1000 according to the present embodiment includes an image forming section 100 to form an image on a sheet-shaped recording medium such as a sheet, a fixing section 200 to fix the image onto the recording medium, a recording medium feeder 300 to feed the recording medium to the image forming section 100, and a recording medium ejection section 400 to eject the recording medium to an outside of the image forming apparatus 1000.

The image forming section 100 includes four process units 1Y, 1M, 1C, and 1Bk as image forming units, an exposure device 6 to form an electrostatic latent image on a photoconductor 2 in each of the process units 1Y, 1M, 1C, and 1Bk, and a transfer device 8 to transfer an image onto the recording medium.

Each of the process units 1Y, 1M, 1C, and 1Bk includes the photoconductor (e.g., electrostatic latent image bearer) 2 serving as an image bearer bearing the image on the surface of the image bearer, a charger 3 to charge the surface of the photoconductor 2, a developing device 4 to supply the toner as the developer to the surface of the photoconductor 2 to form a toner image, and a cleaner 5 to clean the surface of the photoconductor 2.

The photoconductor 2 is a rotator that configured to hold an electrostatic latent image on their surface. The photoconductor 2 may have a drum shape, as shown in FIG. 1, or otherwise, it may have endless belt shape.

The charger 3 is a member that electrostatic charges the surface of the photoconductor 2. The charger 3 is not limited to the roller type charger as shown in FIG. 1, but it may be any shape as long as it could uniformly charge the surface of the photoconductor 2 by applying a voltage, and it may be appropriately selected according to the purpose. Specifically, in addition to a contact type charger such as a conductive or semi-conductive roller type charger, a magnetic brush type charger, a fur brush type charger, a film type charger, or a rubber blade type charger, it may also be a non-contact type charger using corona discharge method.

Each developing device 4 supplies toner to the electrostatic latent image formed on the photoconductor 2, to form a toner image thereon. The each of the developing device 4 contains different color toners (e.g., developers), i.e., yellow (Y), magenta (M), cyan (C), and black (Bk) toners, respectively for each process units 1Y, 1M, 1C, and 1Bk, corresponding to decomposed color separation components of a full-color image.

Each cleaner (e.g., cleaning device) 5 removes residual toner or other material remained on each of the photoconductors 2. For example of the cleaner, a cleaning blade disposed so as to contact with the surface of the photoconductor 2 is used.

The exposure device 6 forms an electrostatic latent image on a photoconductor 2 by exposing an electrostatic charge surface of the photoconductor 2. The exposure device 6 is not particularly limited as long as it can expose the electrostatic charge surface of the photoconductor 2, and can be appropriately selected according to the purpose. Specifically, various exposure devices such as a copier optical system, a rod lens array system, a laser optical system, a liquid crystal shutter optical system, and an LED optical system are exemplified.

The transfer device 8 is a device to transfer an image onto the recording medium. The transfer device 8 includes an intermediate transfer belt 11, primary transfer rollers 12, and a secondary transfer roller 13. The intermediate transfer belt 11 is an endless belt stretched by a plurality of support rollers. Four primary transfer rollers 12 are disposed inside the loop of the intermediate transfer belt 11. Each of the primary transfer rollers 12 is in contact with the corresponding photoconductor 2 via the intermediate transfer belt 11 to form a primary transfer nip between the intermediate transfer belt 11 and each photoconductor 2. The secondary transfer roller 13 is in contact with the outer circumferential surface of the intermediate transfer belt 11 to form a secondary transfer nip.

The fixing section 200 includes a fixing device 20 as a heating device that heats the recording medium bearing the transferred image. The fixing device 20 includes a pair of rotators 19A, 19B, and a heater to heat at least one of the pair of rotators 19A, 19B.

The recording medium feeder 300 is a mechanism of the image forming apparatus 1000 which feeds a sheet P to the image forming section 100. The recording medium feeder 300 includes a sheet tray 14 to store sheets P as recording media and a feed roller 15 to feed the sheet P from the sheet tray 14. Although a "recording medium" is described as a "sheet of paper" (referred to simply as "sheet") in the following description, the "recording medium" is not limited to the sheet of paper. Examples of the "recording medium" include not only a sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The recording medium ejection section 400 is a mechanism of the image forming apparatus 1000 which ejects sheet P from the image forming apparatus 1000. The recording medium ejection section 400 includes an output roller pair 17 to eject the sheet P to the outside of the image forming apparatus 1000 and an output tray 18 to place the sheet P ejected by the output roller pair 17.

To provide a fuller understanding of the embodiments of the present disclosure, a description is now given of the printing operation of the image forming apparatus 1000 according to the present embodiment, with continued reference to FIG. 1.

When the image forming apparatus 1000 starts the printing operation from an operation or an exterior device (terminal), the photoconductors 2 in the process units 1Y, 1M, 1C, and 1Bk start rotating, and in each of the process units 1Y, 1M, 1C, and 1Bk, the charger 3 uniformly charges the surface of the photoconductor 2 at uniformed high electric potential. Based on image data of a document read by a document reading device or print data instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image formed on the photoconductor 2 to form the toner image on the photoconductor 2. Thus, the toner images for each color are formed on each of the photoconductors 2.

The toner images formed on the photoconductors 2 reach the primary transfer nips defined by the primary transfer rollers 12 with the rotation of the photoconductors 2 and are transferred onto the intermediate transfer belt 11 rotated counterclockwise in FIG. 1 successively such that the toner images are superimposed on the intermediate transfer belt 11, forming a full-color toner image thereon. Thus, the full-color toner image is formed on the intermediate transfer belt 11. The image forming apparatus 100 can form a monochrome toner image by using any one of the four process units 1Y, 1M, 1C, and 1Bk, or can form a bicolor toner image or a tricolor toner image by using two or three of the process units 1Y, 1M, 1C, and 1Bk. After the toner image is transferred to the intermediate transfer belt 11, the cleaner 5 removes the residual toner that remains on the photoconductor 2 from the surface of the photoconductor 2.

In accordance with the rotation of the intermediate transfer belt 11, the toner image transferred onto the intermediate transfer belt 11 is conveyed to the secondary transfer nip (the position of the secondary transfer roller 13) and is transferred onto the sheet P conveyed from the recording medium feeder 300. When the image forming apparatus 1000 starts the printing operation, the feed roller 15 starts rotating to feed the sheet P from the sheet tray 14. The sheet P fed from the sheet tray 14 is brought into contact with a timing roller pair 16 and temporarily stopped for predetermined period. After that, the timing roller pair 16 restart rotating to feed the sheet P into the secondary transfer nip, such that the toner image transferred onto the intermediate transfer belt 11 coincides with the timing when the sheet P reaches to the secondary transfer nip. Thus, the toner image transferred onto the intermediate transfer belt 11 is transferred onto the sheet P.

Then, the sheet P bearing the toner image is conveyed to the fixing part 200. In the fixing part 200, the pair of rotators 19A, 19B applies heat and pressure to the toner image on the sheet P to fix the toner image onto the sheet P. Then, the sheet P bearing the fixed toner image is conveyed to the recording medium ejection section 400. In the recording medium ejection section 500, the output roller pair 17 ejects the sheet P onto the output tray 18. Thus, a series of printing operations is completed.

Figure 2:
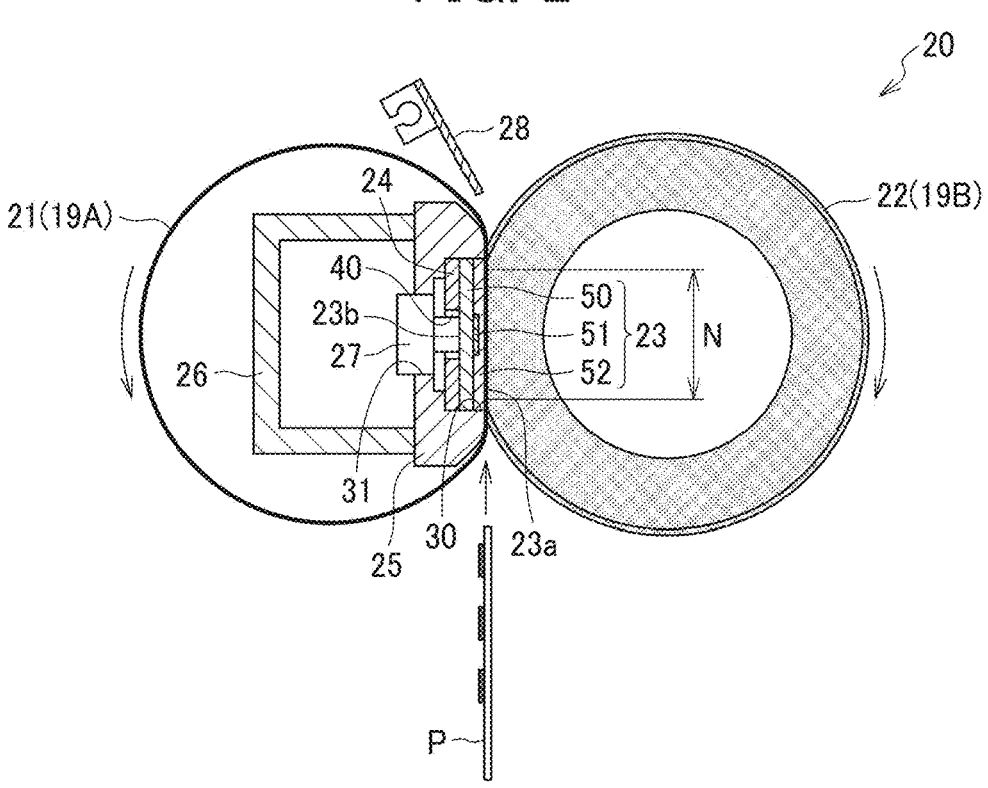
FIG. 2 A schematic configuration diagram of a fixing device.

FIG. 2 is a schematic cross-sectional view of the fixing device 20 according to the present disclosure.

As illustrated in FIG. 2, the fixing device 20 according to the present disclosure includes a pair of rotators 19A, 19B, a heater 23 as a heating member, a high thermal conduction member 24 as a heat transfer assisting member, a heater holder 25 as a holder, a stay 26, a thermistor 27 as a temperature detector, a separator 28, etc.

One of the pair of rotators 19A, 19B, which is 19A, is a fixing belt 21 disposed on a side of the sheet P on which the unfixed toner image is formed. The other one of the pair of rotators 19A, 19B, which is 19B, is the pressure roller 22 disposed opposite to the fixing belt 21. The pressure roller 22 and the fixing belt 21 is biased to be in contact with each other by a biasing member such as spring. Thus, a fixing nip N is formed between the fixing belt 21 and the pressure roller 22.

The fixing belt 21 is an endless belt including a base layer, an elastic layer, and a release layer successively layered from the inner circumferential surface to the outer circumferential surface. The base is made of metal such as nickel or stainless steel or resin such as polyimide. The elastic layer is made of rubber such as silicone rubber, silicone rubber foam, or fluorine rubber. The elastic layer of the fixing belt 21 eliminates slight surface asperities of the fixing belt 21, thus facilitating uniform conduction of heat to the toner image on the sheet P. The release layer of the fixing belt 21 is made of, for example, tetrafluoroethylene-perfluoroalkyl-vinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the sheet P from the fixing belt 21.

The pressure roller 22 includes a hollow or solid iron core, an elastic layer on an outer circumferential surface of the core, and a release layer resting on an outer circumferential surface of the elastic layer. The core is made of metal such as iron. The elastic layer is made of, for example, silicone rubber, silicone rubber foam, or fluorine rubber. The release layer is made of a fluororesin such as PFA or PTFE.

The heater 23 as a heat source, disposed at the fixing nip N and is contacting the inner circumferential surface of the fixing belt 21, is a heater having a planar or plate like shape. The heater 23 in the present embodiment contacts the pressure roller 22 via the fixing belt 21 and serves as a nip formation pad to form the fixing nip N between the pressure roller 22 and the fixing belt 21. The heater 23 includes resistive heat generators 51, and when power is supplied to the heater 23, and the resistive heat generators 51 generate heat. The heater 22 includes a planar base 50, resistive heat generators 51 disposed on the base 50, and an insulation layer 52 covering the resistive heat generators 51. When the resistive heat generators 51 generate heat, the heat is transferred to the inner circumferential surface of the fixing belt 21 via the insulation layer 52 to heat the fixing belt 21. Although the resistive heat generators 51 are disposed on the side of the base 50 facing the fixing belt 21 (that is, the fixing nip N) in the present disclosure, the resistive heat generators 51 may be disposed on the opposite side of the base 50, that is, the base 50 contacts to the inner circumferential surface of the fixing belt 21. In this case, since the heat of the resistive heat generators 51 is transmitted to the fixing belt 21 through the base 50, it is preferable that the base 50 be made of a material with high thermal conductivity.

The material of the base 50 is a nonmetallic material having excellent thermal resistance and insulating properties, such as glass, mica, or ceramic such as alumina or aluminum nitride in the present disclosure. Interposing another insulation layer between the base 50 and the resistive heat generators 51 enables using a conductive material such as a metal material as the material of the base 50. Low-cost aluminum or stainless steel is favorable as the metal material of the base 50. To enhance the thermal uniformity of the heater 23 and image quality, the base 50 may be made of a material having high thermal conductivity, such as copper, graphite, or graphene. Graphene is a sheet like structure which is formed by joint structure of carbon atoms.

The resistive heat generators 51 is formed by using screen-print method or the like. Specifically, silver palladium (AgPd) and glass powder are mixed to make paste and the paste is screen-printed on the surface of the base 50. After the paste is screen-printed, the base 50 is subject to firing. Thus, the resistive heat generator 51 is produced. The material of the resistive heat generator 51 may contain a resistance material, such as silver alloy (e.g., AgPt) or ruthenium oxide (RuO2). The insulation layer 52 may be made of, for example, heat-resistant glass.

The high thermal conduction member 24 is a member to assist a transfer of the heat generated from the heater. The high thermal conduction member 24 is made of a material having thermal conductivity higher than the thermal conductivity of the holder 25. The high thermal conduction member 24 is made of, for example, copper, aluminum, graphene. The high thermal conduction member 24 in the present disclosure is disposed so as to be in contact with a surface 23*b*, which is a surface of the heater 23 opposite a surface of the heater 23 contacting the inner circumferential surface of the fixing belt 21 (23*a*). Thus, since the heat from the heater 23 is efficiently distributed via the high thermal conduction member 24, it would suppress the unevenness temperature rise of the heater 23. The high thermal conduction members 24 is not limited to a single material with a single layer, it may also be made of plurality of materials with plurality of layers.

The heater holder 25 is a holder to hold the heater 23 and the high thermal conduction member 24. The heater holder 25 holds the heater 23 and the high thermal conduction member 24 are fitted into a recess formed portion 30. Since the heater 23 and the high thermal conduction member 24 are fitted into a recess formed portion 30, it restricts the movement of the heater 23 and the high thermal conduction member 24 in an up-down direction of FIG. 2 and an front-back direction of FIG. 2 (perpendicular direction to up-down direction and right-left direction of FIG. 2). Since the heater holder 25 is subject to temperature increase by heat from the heater 23, the heater holder 25 is preferably made of a heat-resistant material. The heater holder 25 made of heat-resistant resin having low thermal conduction, such as a liquid crystal polymer (LCP), reduces heat transfer from the heater 23 to the heater holder 25 and provides efficient heating of the heater 23.

An edge wall of the recess formed portion 30 may be higher than a thickness of the heater 23 to form convex shape toward the nip N (projecting more toward the nip N than the heater 23) along the edge. By doing so, it may prevent damage of the fixing belt 21 caused by a contact of the heater's edge and the fixing belt 21. Also, since it could enlarge a curvature of the fixing belt 21, the releasability of the sheet P from the fixing belt 21 could be increased. On the other hand, if the risk according to the damage of the fixing belt 21 caused by a contact of the heater's edge and the fixing belt 21 is low enough, the edge wall of the recess formed portion 30 may be lower than the thickness of the heater 23.

The stay 26 is a support member (reinforcement) to support (reinforce) the heater holder 23. The stay 26 supports the heater holder 25 from a side opposite a pressure roller side to prevents the heater 23 from being bent by a pressing force of the pressure roller 22. As a result, the fixing nip N having a uniform width is obtained. The stay 26 is preferably made of iron-based metal such as steel use stainless (SUS) or steel electrolytic cold commercial (SECC) to enhance the rigidity.

The temperature sensor 27 is a temperature detector that contacts the surface 23*b* of the heater 23 opposite the fixing belt 23 contacting surface 23*a* and detects the temperature of the heater 23. The temperature sensor 27 in the present disclosure is a thermostat. The thermostats cuts off a current flowing through the resistive heat generators under a certain condition (the temperature rise reaches to the predetermined temperature). The temperature sensor 27 is disposed so as to contact directly to the heater 23 through a hole 31 of the holder 25 and through a hole 40 of the high thermal conduction member 24.

The separator 28 is a member to separate the sheet P, after passing through the fixing nip N, from the outer circumferential surface of the fixing belt 21. The separator 28 is disposed on the downstream side of the fixing nip N in the sheet conveyance direction. The separator 28 is attached to the frame of the fixing device 20 such as side plate. The end portion of the separator 28 is arranged at a portion close to the outer peripheral surface of the fixing belt 21 with a gap there between. Also, the separator 28 may be attached so as the end portion of the separator 28 to be movable in an approaching direction toward the outer peripheral surface of the fixing belt 21 and a separating direction from the outer peripheral surface of the fixing belt 21. When the sheet P, that has passed through the fixing nip N, contacts to the end portion of the separator 28, the position of the end portion of the separator 28 is to be between the sheet P and the fixing belt 21, in this way, the sheet P is separated from the outer peripheral surface of the fixing belt 21.

Figure 3:
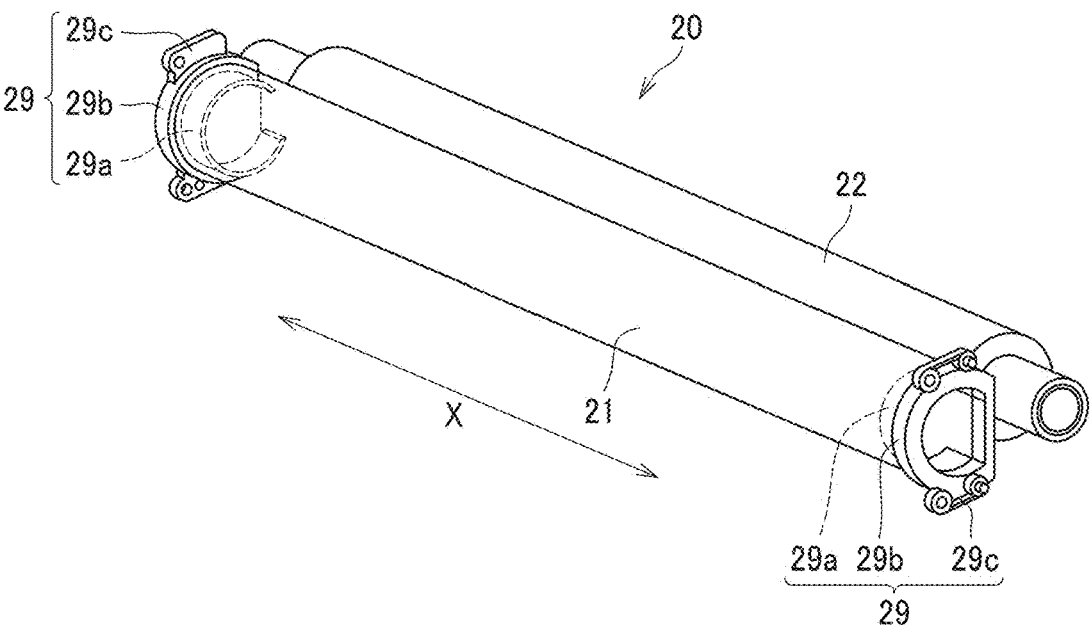
FIG. 3 A perspective view of a fixing device.

FIG. 3 is a perspective view according to the present disclosure of the fixing device 20.

Belt holders 29 illustrated in FIG. 3 are a pair of rotator holders and rotatably hold both end portions of the fixing belt 21 in the longitudinal direction. In the following description, the "longitudinal direction" of the fixing belt 21 means a direction orthogonal to the rotation direction of the fixing belt and along the outer circumferential surface of the fixing belt. The above-described "longitudinal direction" of the fixing belt 21 is a direction indicated by a two-headed arrow X in FIG. 3 and a direction parallel with the rotation axis direction of the pressure roller 22 or the width direction of the sheet passing through the fixing nip N. The width direction of the sheet is a direction intersecting a sheet conveyance direction in which the sheet is conveyed.

The belt holder 29 includes a belt holding portion 29*a*, a restraint portion 29*b*, and a fixed portion 29*c*. The belt holding portion 29*a* has a C-shaped cross-section and is inserted into the longitudinal end portion of the fixing belt 21, from the longitudinal direction X, to support the fixing belt 21 from the inner surface of the fixing belt 21. Thus, the outer diameter of the belt holding portion 29*a* is smaller than the inner diameter of the fixing belt 21. The restraint portion 29b has an outer diameter greater than the inner diameter of the fixing belt 21. Thus, even when the fixing belt 21 moves toward one direction of the longitudinal direction X, the longitudinal end portion of the fixing belt 21 contacts the restraint portion 29b and the movement of the fixing belt in the longitudinal direction X is restrained. The fixed portion 29c is a portion which is fixed to the flame of the fixing device 20. Since the fixed portion 29c is fixed to the flame of the fixing device 20, the fixing belt 21 is held rotatably by the belt holder 29.

Figure 4:
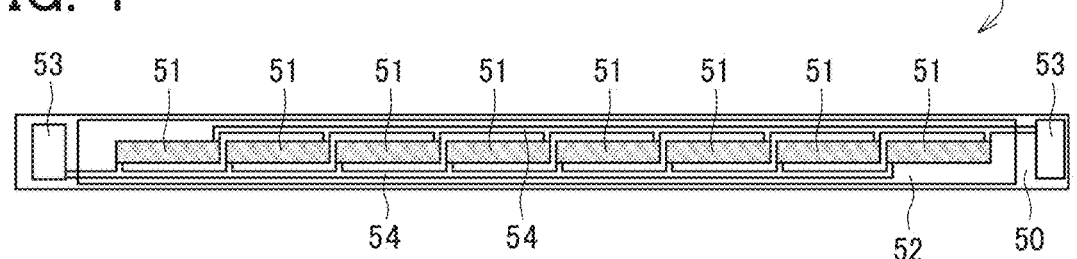
FIG. 4 A plane view of a heater.

FIG. 4 is a plain view of the heater 23 according to the present disclosure. As illustrated in FIG. 4, the heater 23 according to the present disclosure includes a base 50 having a plate shape, multiple resistive heat generators 51 disposed on the base 50, an insulation layer 52 covering the multiple resistive heat generators 51, and a pair of electrodes 53 connected to multiple heat generators 51 via power supply lines 54. The heater 23 is disposed in the fixing device 20 such that the longitudinal direction of the heater 23 is substantially parallel with the longitudinal direction X of the fixing belt 21.

The multiple resistive heat generators 51 are arranged at intervals in the longitudinal direction of the base 50. A gap between neighboring resistive heat generators 51 is preferably 0.2 mm or more, and is more preferably 0.4 mm or more, from the viewpoint of maintaining the insulation between the neighboring resistive heat generators 51. In addition, the gap between the resistive heat generators 51 adjacent to each other is preferably 5 mm or less, and is more preferably 1 mm or less, from the viewpoint of reducing temperature unevenness across an area in the longitudinal direction because a too large gap between the resistive heat generators 51 adjacent to each other easily causes a temperature drop in the gap. Each of the resistive heat generators 51 is coupled to the pair of electrodes 53 via the power supply lines 54. In the present disclosure illustrated in FIG. 4, one of the pair of electrodes 53 is disposed on one end of the base 50 in the longitudinal direction of the base 50, and the other one of the pair of electrodes 53 is disposed on the other end of the base 50 in the longitudinal direction. The resistive heat generators 51 are electrically coupled in parallel to the pair of electrodes 53. However, the number/shape/arrangement of the resistive heat generators 51, the electrodes 53 and the power supply lines 54 are not limited to the disclosure of FIG. 4.

The insulation layer 52 covers the resistive heat generators 51 and power supply lines 54 to enhance durability and insulate the resistive heat generators 51 and power supply lines 54 from other parts. However, the insulation layer 52 does not cover the electrode 53 to expose the electrode 53 so as to be connected to the connector. Connecting the connector as a power supply component to each of the electrodes 53 enables supplying power from a power supply to each resistive heat generator 51.

The fixing device 20 according to the present disclosure operates as follows.

When the printing operation starts, a driver drives and rotates the pressure roller 22 in a direction indicated by an arrow in FIG. 2, and the rotation of the pressure roller 22 rotates the fixing belt 21. The lubricant is applied to the inner circumferential surface of the fixing belt 21 to reduce the sliding friction between the fixing belt 21 and the heater 23. The power is supplied to the heater 23, and the heater 23 generates heat to heat the fixing belt 21. Then, when the temperature of the fixing belt 21 reaches to a predetermined fixing temperature that can fix the toner image onto the sheet, the sheet P bearing the unfixed toner image is conveyed to the fixing nip N between the fixing belt 21 and the pressure roller 22, and the fixing belt 21 and the pressure roller 22 apply heat and pressure to the sheet P to fix the unfixed toner image onto the sheet P. After that, the sheet P is separated from the fixing belt 21 by the separator and ejected from the fixing device 20.

Here, a problem related to a responsiveness of the temperature sensor will be described by referencing the present disclosure.

As in the present disclosure, in the configuration using a planar heater 23 with a small heat capacity as a heating source, since the temperature of the heater 23 rapidly increases, it is possible to shorten the first print time and save energy. On the other hand, when the temperature difference between the heating portion and the non-heating portion of the heater 23 is increased by the rapid temperature increase, there is a possibility that the base 50 of the heater 23 is damaged by the stress difference due to thermal expansion. Therefore, in the present disclosure, the temperature sensor 27 for detecting the temperature of the heater 23 is provided in order to stop the heat generation by cutting off the power supply to the heater 23 when the temperature of the heater 23 becomes a predetermined temperature or higher.

Further, in general fixing device, there is a problem that the temperature of the non-passing-region, where the sheet P does not pass, increases when the paper with a width smaller than the heating area of the heater 23 passes. Particularly, in a case when the sheets are continuously printed, the temperature rise in the non-sheet-passing-region becomes remarkable, so that the temperature of the rotating body such as the fixing belt 21 excessively rises, and the rotating body may deteriorate or be damaged. Therefore, in the present disclosure, the high thermal conduction member 24 is brought into contact with the heater 23 to disperse the heat from the non-passage-region of the heater 23 to their peripheral area via the high thermal conduction member 24. Further, since the heat of the heater 23 in the non-passing-region is moved to the sheet passing area, and such heat is effectively used for the fixing process, it will improve the energy saving.

However, the temperature sensor 27 has to detect the temperature of the heater 23 through the high thermal conduction member 24, when the high thermal conduction member 24 is arranged between the temperature sensor 27 and the heater 23 in order to contact the high thermal conduction member 24 to the heater 23, the responsiveness of the temperature sensor 27 is reduced. In this case, the temperature sensor 27 cannot detect the temperature rise of the heater 23 quickly, as a result, it would be difficult to prevent damage of the heater 23 due to the temperature rise. Therefore, in the present disclosure, the hole 40 is provided to the high thermal conduction member 24, so the temperature sensor 27 may directly contact the heater 23 through the hole 40. Thus, the temperature sensor 27 may detect the temperature rise of the heater 23 quickly, so that the damage of the heater 23 due to the temperature rise would be effectively prevented.

Figure 16:
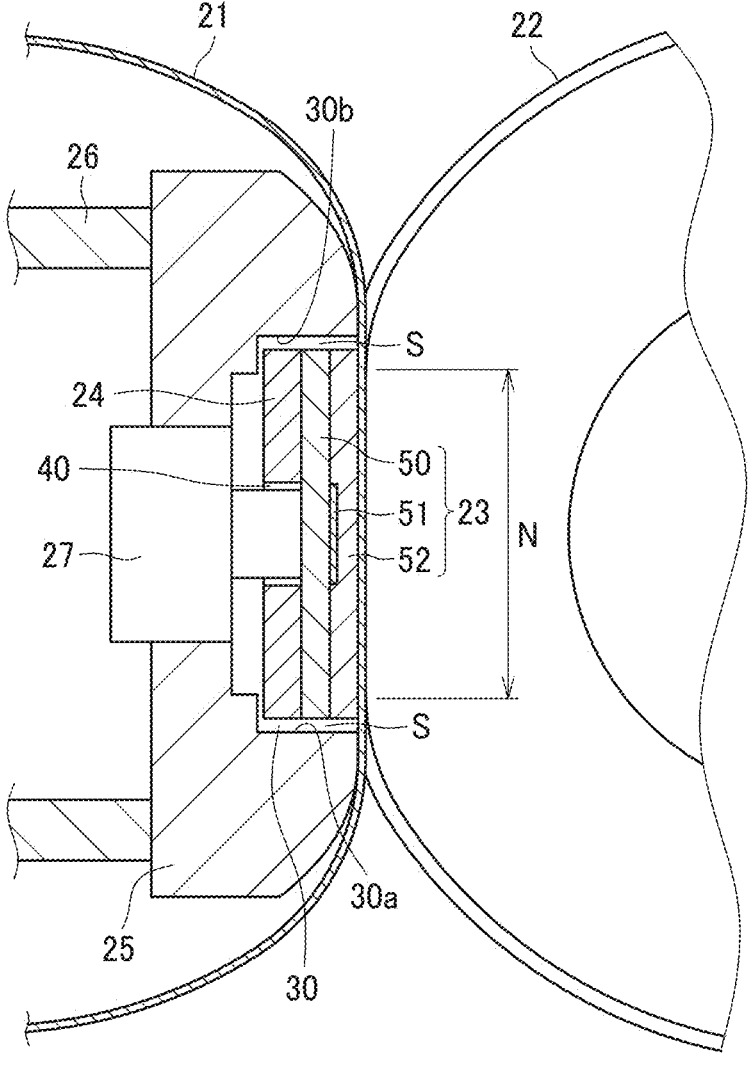
FIG. 16 A reference diagram for explaining problems related to the response of the temperature sensor.

Meanwhile, the housing portion (e.g., recess, groove, hole, depression) 30 of the holder 25 to accommodate the heater 23 and the high thermal conduction member 24 is formed slightly larger than the size of the heater 23 and the high thermal conduction member 24 to avoid interference therebetween according to the thermal expansion. Therefore, as shown in FIG. 16, there is a gap S formed between the inner wall surface 30a of the housing portion 30 and the heater 23/the high thermal conduction member 24, or/and between the inner wall surface 30b of the housing portion 30 and the heater 23/the high thermal conduction member 24 respectively, such that the heater 23 and the high thermal conduction member 24 is movably housed in the housing portion 30.

Figure 17:
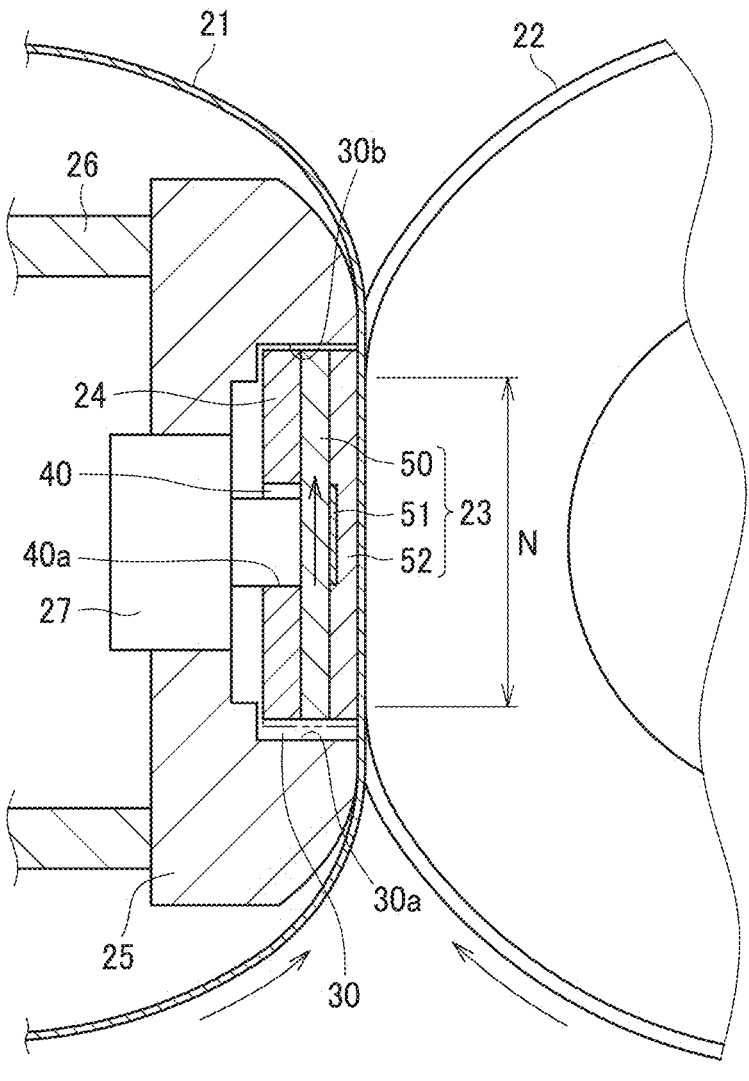
FIG. 17 Another reference diagram for explaining problems related to the response of the temperature sensor.

Therefore, as shown in FIG. 17, when the fixing belt 21 rotates, the heater 23 and the high thermal conduction member 24 may move according to the movement (rotation) of the fixing belt 21. On the other hand, since the temperature sensor 27 is fixed to the holder 25 or the like, when the high thermal conduction member 24 moves, the inner surface 40$a$ of the hole 40 of the high thermal conduction member 24 contacts with the temperature sensor 27, and the responsiveness of the temperature sensor 27 may decrease. That is, when the inner surface 40$a$ of the hole 40 contacts with the temperature sensor 27, since the heat transfers from the temperature sensor 27 to the high thermal conduction member 24, the temperature rise of the heater 23 may not be detected quickly and accurately by the temperature sensor 27.

As described above, with the configuration, in which the temperature sensor 27 contacts with the heater 23 through the hole portion 40 of the high thermal conduction member 24, the high thermal conduction member 24 may contact the temperature sensor 27 by the positional deviation. Therefor there is a problem such that the responsiveness of the temperature sensor 27 may be decreased. To cope with such problem, the size of the hole portion 40 may be enlarged to prevent the contact between the hole portion 40 and the temperature sensor 27 even if the high thermal conduction member 24 is moved by the positional deviation. However, if the hole portion 40 was enlarged, the contact area between the high thermal conduction member 24 and the heater 23 will be reduced, and therefore the expected effect of the heat dispersion according to the high thermal conduction member 24 may not be obtained. As described above, it is difficult to achieve both the expected effect of the heat dispersion according to the high thermal conduction member 24 and the high responsiveness of the temperature sensor 27 by just enlarging the hole portion 40. To achieve both the expected effect of the heat dispersion according to the high thermal conduction member 24 and the high responsiveness of the temperature sensor 27, the following configurations are adopted.

Hereinafter, a configuration according to the present disclosure will be described with reference to FIGS. 5 and 6.

Figure 5:
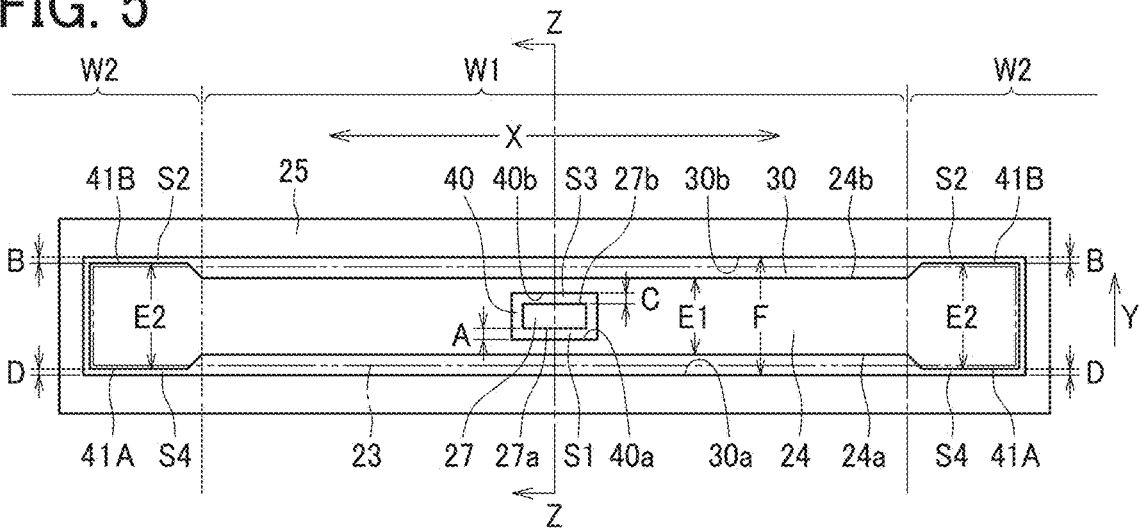
FIG. 5 A plane view showing a heat transfer assisting member, a holder, and a temperature sensor.

FIG. 5 is a plan view showing the high thermal conduction member 24, the holder 25, and the temperature sensor 27 according to the present disclosure. FIG. 6 is a cross-sectional view of the high thermal conduction member 24 and the holder 25 at Z-Z line of FIG. 5. An arrows Y in FIGS. 5 and 6 indicate the rotation direction of the fixing belt 21 at the belt contact surface 23$a$ of the heater 23. In the following description, the rotation direction of the fixing belt 21 at the belt contact surface 23$a$ is referred to as a "belt moving direction".

As shown in FIG. 5, the high thermal conduction member 24 is formed as to be a plate shape that extends in the longitudinal direction X of the fixing belt 21 in the same manner as the heater 23. At the center of the high thermal conduction member 24 in the longitudinal direction, the hole portion 40 to dispose the temperature sensor 27 is formed. In the present disclosure, since the temperature sensor 27 is disposed in the sheet passage region W1, through which the paper passes, the hole portion 40 is also disposed in the sheet passage region W1.

The width of both ends, in the longitudinal direction X, of the high thermal conduction member 24 is formed wider, in the belt moving direction Y, than the width of the central portion of the high thermal conduction member 24 (E1<E2). Therefore, the high thermal conduction member 24 has protrusions 41A,41B at both longitudinal ends W2, where the paper does not pass, and the protrusions 41A,41B protrude, in the belt moving direction Y, from both the upstream side 24$a$ and the downstream side 24$b$. That is, the width E2 of the protrusions 41A,41B (i.e., first portion) in the belt moving direction Y is larger than the width E1 of the other parts (i.e., second portion) in the belt moving direction Y.

In contrast, the housing portion 30 of the holder 25 is formed in the same width F over the longitudinal direction X. Thereby, the upstream end 30$a$ in the belt moving direction Y (upstream inner wall surfaces of the housing portion 30) is parallel to the downstream end 30$b$ in the belt moving direction Y (downstream inner wall surfaces of the housing portion 30).

When the fixing belt 21 rotates, the high thermal conduction member 24 is moved in the belt moving direction Y according to the movement of the fixing belt 21. Therefor the downstream end 24$b$ of the high thermal conduction member 24 approaches the downstream end 30$b$ of the housing portion 30. Also, since the hole portion 40 of the high thermal conduction member 24 moves according to the movement of the high thermal conduction member 24, the upstream end 40$a$ of the hole portion 40 approaches the upstream end 27$a$ of the temperature sensor 27. At this time, if the upstream end 40$a$ of the hole portion 40 comes into contact with the upstream end 27$a$ of the temperature sensor 27, the responsiveness of the temperature sensor 27 may be deteriorated, and as a result, the temperature rise of the heater 23 may not be detected quickly and accurately by the temperature sensor 27.

Accordingly, in the present disclosure, the size A of the gap S1 and the size B of the gap S2 (refer to FIGS. 5 and 6) are arranged to have the relationship of A>B, so that the upstream end 40$a$ of the hole portion 40 may not contact the upstream end 27$a$ of the temperature sensor 27.

Gap S1 is the minimum gap between the upstream end 27$a$ of the temperature sensor 27 and the upstream end 40$a$ of the hole portion 40 facing the temperature sensor 27. On the other hand, the gap S2 is the minimum gap between the downstream end 24$b$ of the high thermal conduction member 24 and the downstream end 30$b$ of the housing portion 30 facing the high thermal conduction member 24. In this case, the gap between the downstream end 24$b$ of the high thermal conduction member 24 and the downstream end 30$b$ of the housing portion 30 is formed to be smallest at both ends of the high thermal conduction member 24 (at the protrusion 41B), the minimum gap S2 will be the gap between the protrusion 41B and the housing portion 30. In contrast, since the gap between the upstream end 27$a$ and the upstream end 40$a$ of the hole portion 40 of the temperature sensor 27 is basically the same size at any point, the minimum gap S1 may be measured at any point. The minimum gap S1,S2 varies depending on the posture of the high thermal conduction member 24 in the housing portion 30, but the size A, B of the minimum gap S1,S2 may be measured at any of the posture as long as they are the minimum gap.

Figure 7:
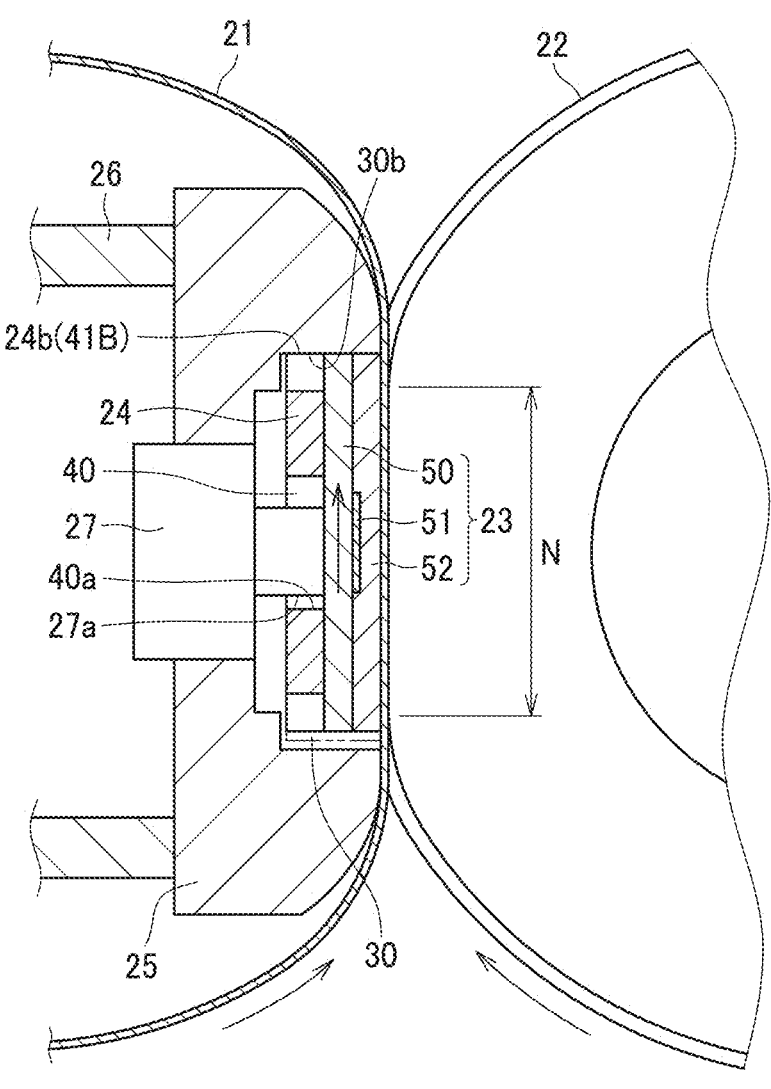
FIG. 7 A diagram showing an aspect when the heat transfer assisting member moved in the belt moving direction.

Thus, since the size A of the minimum gap S1 and the size B of the minimum gap S2 are configured to satisfy the relationship of A>B in the present disclosure, the contact between the high thermal conduction member 24 and the temperature sensor 27 is avoided despite the movement of the high thermal conduction member 24 due to the rotation of the fixing belt 21. In other words, as illustrated in FIG. 7, even when the high thermal conduction member 24 moves in the belt moving direction Y due to the rotation of the fixing belt 21, the downstream end 24b of the protruding portion 41B of the high thermal conduction member 24 comes into contact with the downstream end 30b of the housing portion 30 before the upstream end 40a of the hole portion 40 comes into contact with the upstream end 27a of the temperature sensor 27, thereby the movement of the high thermal conduction member 24 in the belt moving direction Y is restricted before contacting with the temperature sensor 27. Thus, the contact between the upstream end 40a of the hole portion 40 and the upstream end 27a of the temperature sensor 27 is avoided. Therefore, according to the configuration of the present disclosure, the deterioration of the responsiveness of the temperature sensor 27 due to the contact between the high thermal conduction member 24 and the temperature sensor 27 is prevented, and thus the excellent responsiveness is obtained. Also, since the damage of the heater 23 due to the temperature rise is prevented, the reliability is improved.

Further, according to the configuration of the present disclosure, the size of the hole portion 40 could be minimized for avoiding the contact between the high thermal conduction member 24 and the temperature sensor 27, so that the heat distribution effect of the high thermal conduction member 24 could be highly maintained. That is, the size of the hole portion 40 could be minimized as long as the size of the hole portion 40 satisfies the relationship of A>B, it enables to suppress the deterioration of the function of the high thermal conduction member 24 by enlarging the hole portion 40. Therefore, according to the configuration of the present disclosure, it is possible to ensure the excellent responsiveness of the temperature sensor 27 while maintaining a high function of the high thermal conduction member 24.

Furthermore, in the present disclosure, in addition to avoiding the contact between the high thermal conduction member 24 and the temperature sensor 27 due to the movement in the belt moving direction Y, the contact between the high thermal conduction member 24 and the temperature sensor 27 due to the movement in the direction opposite to the belt moving direction Y is also to be avoided.

Figure 6:
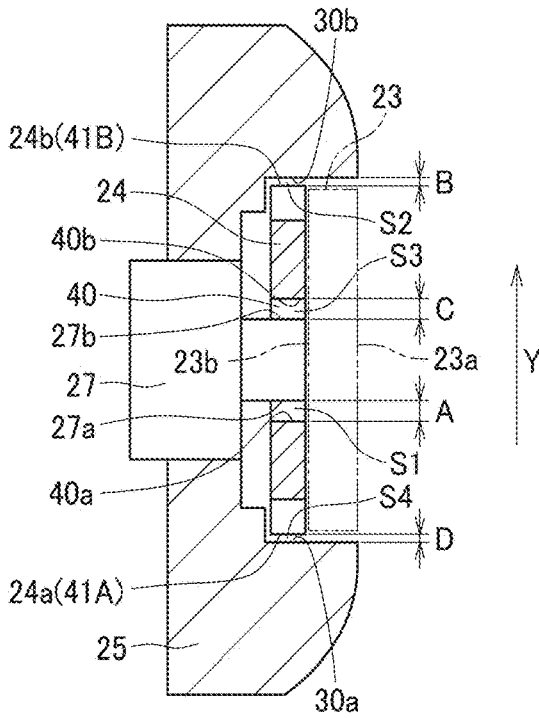
FIG. 6 A cross-sectional view of the heat transfer assisting member and the holder in Z-Z line in FIG. 5

Specifically, the size C of the gap S3 and the size D of the gap S4 shown in FIGS. 5 and 6 have a relationship of C>D. Here, the gap S3 is the minimum gap between the downstream end 27b of the temperature sensor 27 in the belt moving direction Y and the downstream end 40b of the hole portion 40 is an opposing surface facing the downstream end 27b of the temperature sensor 27. On the other hand, the gap S4 is the minimum gap between the upstream end 30a of the housing portion 30 and the upstream end 24a of the high thermal conduction member 24 in the belt moving direction Y and the opposing surface facing the upstream end 30a of the housing portion 30. Further, the minimum gap S4 between the upstream end 24a and the upstream end 30a of the housing portion 30 of the high thermal conduction member 24 is the gap between the projecting portion 41A and the housing portion 30. In contrast, since the gap between the downstream end 27b of the temperature sensor 27 and the downstream end 40b of the hole portion 40 is basically the same size at any point, the minimum gap S3 may be measured at any point. The minimum gap S3,S4 varies depending on the posture of the high thermal conduction member 24 in the housing portion 30, but the size C, D of the minimum gap S3,S4 may be measured at any of the posture as long as they are the minimum gap.

Figure 8:
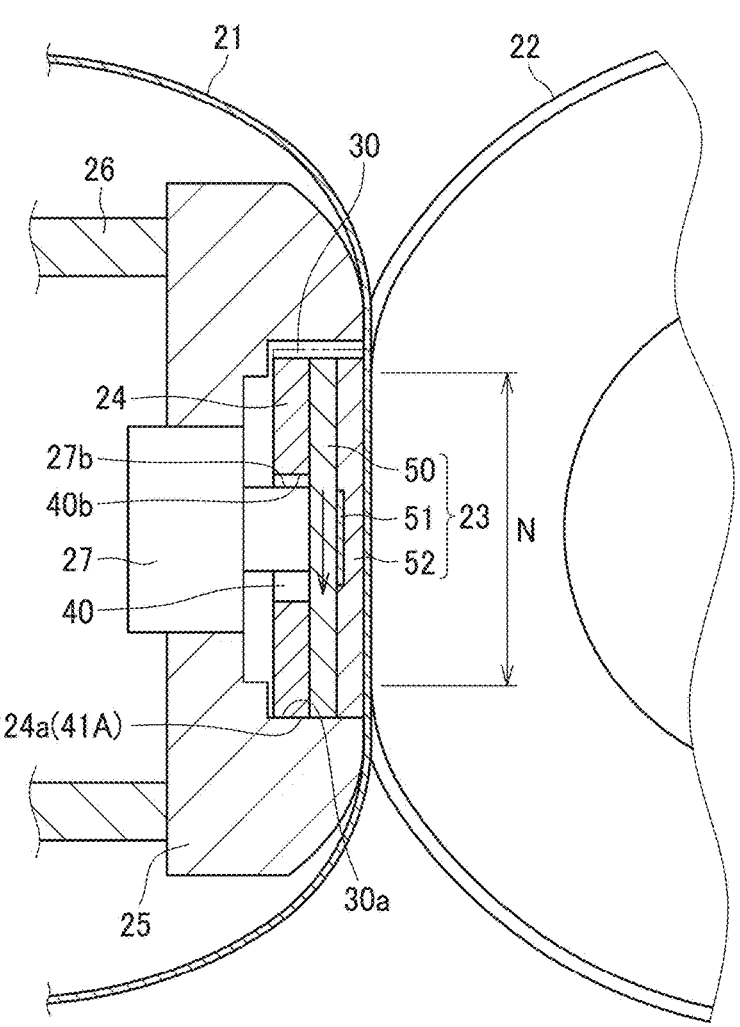
FIG. 8 A diagram showing an aspect when the heat transfer assisting member moved in the opposite direction to the belt moving direction.

Thus, since the size C of the minimum gap S3 and the size D of the minimum gap S4 are configured to satisfy the relationship of C>D in the present disclosure, the contact between the high thermal conduction member 24 and the temperature sensor 27 is avoided even if the high thermal conduction member 24 moved to an opposite belt moving direction Y. In other words, even when the high thermal conduction member 24 moves in the opposite belt moving direction Y as illustrated in FIG. 8, the upstream end 24a of the protruding portion 41A of the high thermal conduction member 24 comes into contact with the upstream end 30a of the housing portion 30 before the downstream end 40b of the hole portion 40 comes into contact with the downstream end 27b of the temperature sensor 27, thereby the movement of the high thermal conduction member 24 in the opposite belt moving direction Y is restricted before contacting with the temperature sensor 27. Thus, the contact between the downstream end 40b of the hole portion 40 and the downstream end 27b of the temperature sensor 27 is avoided. Therefore, according to the configuration of the present disclosure, the deterioration of the responsiveness of the temperature sensor 27 due to the contact between the high thermal conduction member 24 and the temperature sensor 27 is prevented.

Thus, with the configuration of the present disclosure, since the contact between the high thermal conduction member 24 and the temperature sensor 27 can be avoided for both the belt moving direction Y movement and the opposite belt moving direction Y movement, the deterioration of the responsiveness of the temperature sensor 27 due to the contact between the high thermal conduction member 24 and the temperature sensor 27 is highly prevented. Further, by the configuration with avoiding contact between the high thermal conduction member 24 and the temperature sensor 27 in either the belt moving direction Y and the opposite belt moving direction Y, the high thermal conduction member 24 and the holder 25 may be attached without worrying the upstream and downstream directions. That is, even when the upstream and the downstream of the high thermal conduction member 24 and the holder 25 were mounted in the opposite direction, the contact between the high thermal conduction member 24 and the temperature sensor 27 due to the movement in the belt moving direction Y or the opposite belt moving direction Y may be avoided, so that the occurrence of problem due to misassembly may be prevented. Therefore, according to the configuration of the present disclosure, a highly reliable fixing device and a highly reliable image forming apparatus would be provided.

Further, in the present disclosure, when the high thermal conduction member 24 is moved in the belt moving direction Y, the high thermal conduction member 24 and the housing portion 30 contact each other only at both ends (projecting portion 41A, 41B) instead of their entire portion for the belt moving direction Y or the opposite belt moving direction Y, under such configuration, the positioning accuracy of the high thermal conduction member 24 is improved. That is, the high thermal conduction member 24 and the housing portion 30 contact only at the "portions" facing the projecting portion 41A,41B, since this configuration reduces the contact range, the unevenness of the contact surface does not affect the posture of the high thermal conduction member 24 as much as in case if their "entire portion" contacts each other. Further, since the "portions" are at their "both ends", the posture of the high thermal conduction member 24 is settled in an optimal manner. As described above, according to the configuration of the present disclosure, since the positioning accuracy of the high thermal conduction member 24 is improved, contact between the hole portion 40 and the temperature sensor 27 can be more reliably avoided. Further, since the high accurate tolerance is required only at the projecting portion 41A,41B of the high thermal conduction member 24 and their facing portions of the housing portion 30, the manufacturing costs may also be reduced. Note that even the above configuration has the advantages, this configuration is not necessary and it should not be interpreted to limit the scope, the configuration may include the entire portions contacting each other in the belt moving direction Y or/and the opposite belt moving direction Y.

Further, in the present disclosure, since the projecting portions 41A,41B for positioning are arranged in the non-passage regions W2 (i.e., outside of the sheet passage region), the function of the high thermal conduction member 24 in the passing region W1 can be obtained as intended. That is, the sheet passage region W1 of the high thermal conduction member 24 does not have to include the shape for positioning, so it may avoid unevenness temperature transfer function caused due to the shape change of the high thermal conduction member 24. Thus, since the high thermal conduction member 24 may perform the heat dispersion effect as intended in the sheet passage region W1, the uniform performance for heating the sheet may be achieved.

Further, the posture of the high thermal conduction member 24 would be settled in the optimal manner since the protrusions 41A,41B for positioning is disposed in the non-passage regions W2. That is, the posture of the high thermal conduction member 24 under the rotation of the fixing belt 21 would be suppressed since the high thermal conduction member 24 is moved to the position where the protruding portions 41A,41B contact to the housing portion 30, and the protruding portions 41A,41B are not in the passage area W1 but in the non-passage regions W2, which is both longitudinal ends and that is the optimal portion for settling the posture of the high thermal conduction member 24.

Next, another disclosure will be described. Hereinafter, a portion different from the first disclosure will be described, and a description thereof may be omitted as appropriate because the other portions have a same configuration.

Figure 9:
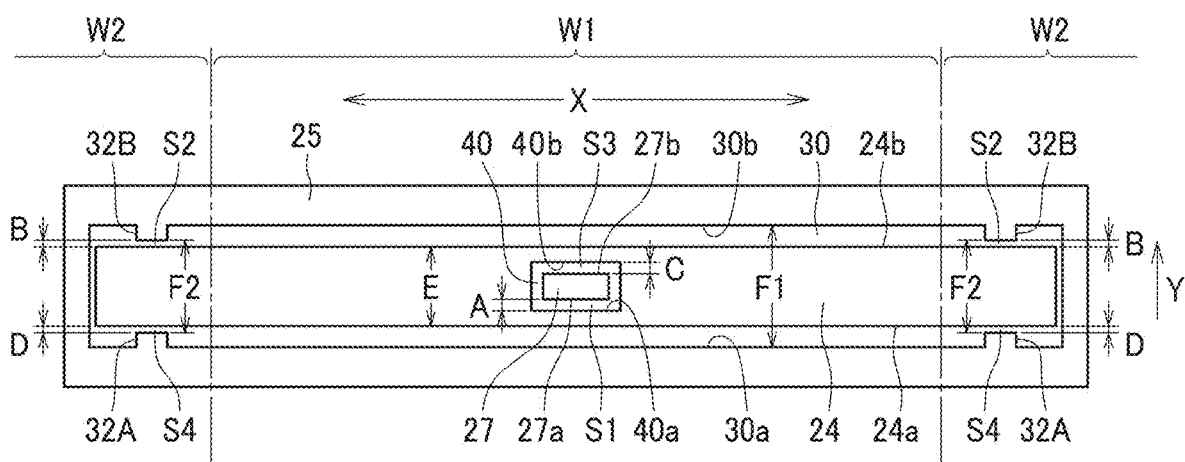
FIG. 9 A plane view illustrating a heat transfer assisting member, a holder, and a temperature sensor according to another disclosure.

FIG. 9 is a plan view showing a high thermal conduction member 24, a holder 25, and a temperature sensor 27 according to a second disclosure.

As shown in FIG. 9 of this disclosure, the holder 25 includes a plurality of protrusions 32A, 32B to position the high thermal conduction member 24. The upstream protrusions 32A are arranged on an upstream portion in the belt moving direction Y at both ends in the longitudinal direction X. The downstream protrusions 32B are arranged on an downstream portion in the belt moving direction Y at both ends in the longitudinal direction X. On the other hand, the high thermal conduction member 24 does not include protrusions for positioning. The width at the protrusions 32A, 32B of the holder 25 is formed to have narrower width than the other portion in the belt moving direction Y (F1>F2) since the protrusions 32A,32B each protrude from the upstream ends 30a and the downstream ends 30b of the housing portion 30 in the belt moving direction Y. Thus, the minimum gaps S2,S4, in the belt moving direction Y, are formed between the protrusions 32A,32B and the high thermal conduction member 24.

Therefore, also in this disclosure, the contact between the high thermal conduction member 24 and the temperature sensor 27 may be avoided by setting the minimum gaps S1,S2,S3,S4 to follow the size relationship of A>B and C>D. That is, when the high thermal conduction member 24 moves in the belt moving direction Y or in the opposite belt moving direction Y, the downstream protrusions 32B or the upstream protrusions 32A contact with the high thermal conduction member 24 before the hole portion 40 contacts with the temperature sensor 27, thereby the movement of the high thermal conduction member 24 is restricted and the contact between the hole portion 40 and the temperature sensor 27 may be avoided. Further, the positioning of the high thermal conduction member 24, in the belt moving direction Y or the opposite belt moving direction Y, is settled by the contact of the protrusions 32A,32B and the high thermal conduction member 24.

As described above, the protrusions for positioning the high thermal conduction member 24 is not limited to the case the protrusions to be provided in the high thermal conduction member 24, but it may also be provided on the housing portion 30 of the holder 25. Further, at least by providing the protrusions on one of the high thermal conduction member 24 and the holder 25, it is possible to reduce the gap between the high thermal conduction member 24 and the housing portion 30 to make the protrusions contact before the high thermal conduction member 24 and the temperature sensor 27 contact each other. As such, the contact between the high thermal conduction member 24 and the temperature sensor 27 is avoidable. Therefore, the minimum gaps S2,S4 for avoiding the contact between the high thermal conduction member 24 and the temperature sensor 27 may be formed by narrow down at least a part of the portion between the high thermal conduction member 24 and the holder 25 facing each other in the belt moving direction Y. That is, the minimum gaps S2,S4 may be formed by either making the width E2 as to the portion of the high thermal conduction member 24 to be larger than the width E1 of the other portion of the high thermal conduction member 24 as in the first disclosure, or by making the width F2 of the portion of the housing portion 30 smaller than the width F1 of the other portion of the housing portion 30 as in the second disclosure.

In particular, as in the second disclosure, the high thermal conduction member 24 may have the same width E over its length if the minimum gaps S2,S4 are formed by differentiating the size of the width of the housing portion 30, and thus the high thermal conduction member 24 may be formed with a simple configuration. In this case, there is an advantage that the yield rate of manufacturing the high thermal conduction member 24 by cutting out from a large plate material may be improved and the manufacturing cost may be reduced.

Also in the second disclosure, when the high thermal conduction member 24 moves in the belt moving direction Y or in the opposite belt moving direction Y, the high thermal conduction member 24 contacts with the protruding portions 32A,32B of the housing portion 30, so the contact area between the high thermal conduction member 24 and the housing portion 30 may be reduced as well. Since the contact area between the high thermal conduction member 24 and the housing portion 30 are reduced, the unevenness of the contact surface does not affect the posture of the high thermal conduction member 24 as much as in case if their entire portion contacts each other. So the posture of the high thermal conduction member 24 is settled in an optimal manner, and it leads to improvement of avoiding the contact between the hole portion 40 and the temperature sensor 27 with high reliability. Further, since the high accurate tolerance is required only at the few portions of the high thermal conduction member 24 and the housing portion 30, the manufacturing costs may also be reduced.

Further, also in the second disclosure, since the protrusions 32A,32B for positioning the high thermal conduction member 24 are arranged in the non-passing regions W2 on both ends in the longitudinal direction, the positioning of the high thermal conduction member 24 is performed at both ends. Since both ends are apart from each other in the longitudinal direction X, the posture of the high thermal conduction member 24 may be settled in an optimal manner.

In addition, the configuration according to the first disclosure and the configuration according to the second disclosure may be combined.

Figure 10:
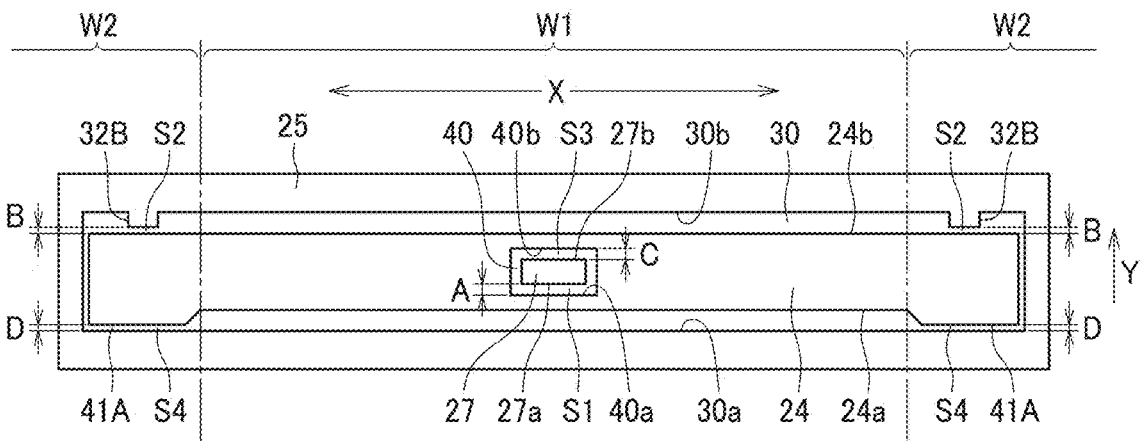
FIG. 10 A diagram showing an example of a combined configuration of FIG. 5 and FIG. 6.

For example, as in the example shown in FIG. 10, in the upstream side of the belt moving direction Y, the protrusions 41A may be formed on the high thermal conduction member 24, and in the downstream side of the belt moving direction Y, the protrusions 32B may be formed on the housing portion 30.

Figure 11:
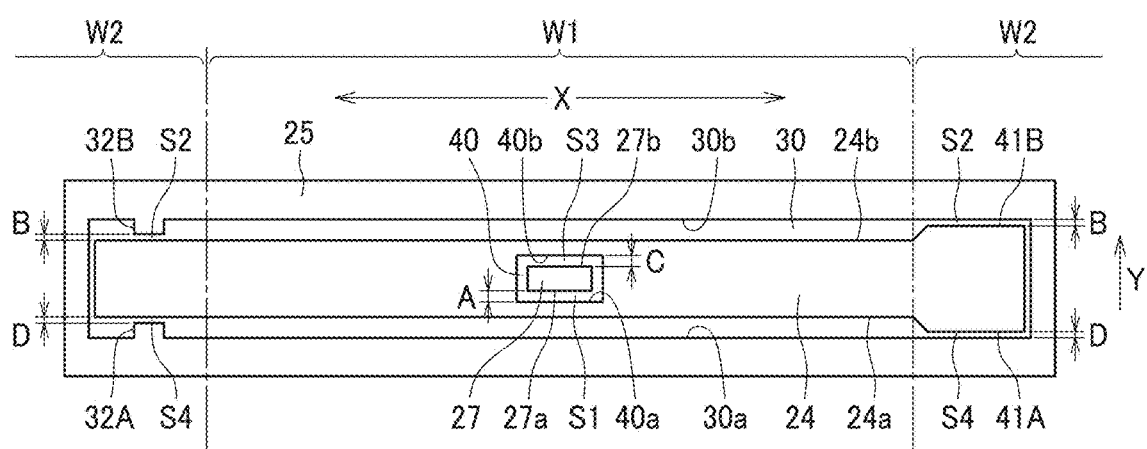
FIG. 11 Another diagram showing an example of a combined configuration of FIG. 5 and FIG. 6.

Further, as in the example shown in FIG. 11, the protrusions 41A,41B may be formed on one side of the high thermal conduction member 24 in the longitudinal direction X (right portion of FIG. 11), the protrusions 32A,32B may be formed on the other side of the housing portion 30 in the longitudinal direction X (left portion of FIG. 11).

As described above, the configurations according to the first disclosure and the second disclosure may be combined together to be asymmetric high thermal conduction member 24 and asymmetric housing portion 30 in either upstream side and the downstream side in the belt moving direction Y or on the one side and the other side in the longitudinal direction X. These asymmetric features prevent from assembly errors according to the assemble of the high thermal conduction member 24 to the holder 25 since the high thermal conduction member 24 would not fit in to the housing portion 30 if it was wrong direction.

Figure 12:
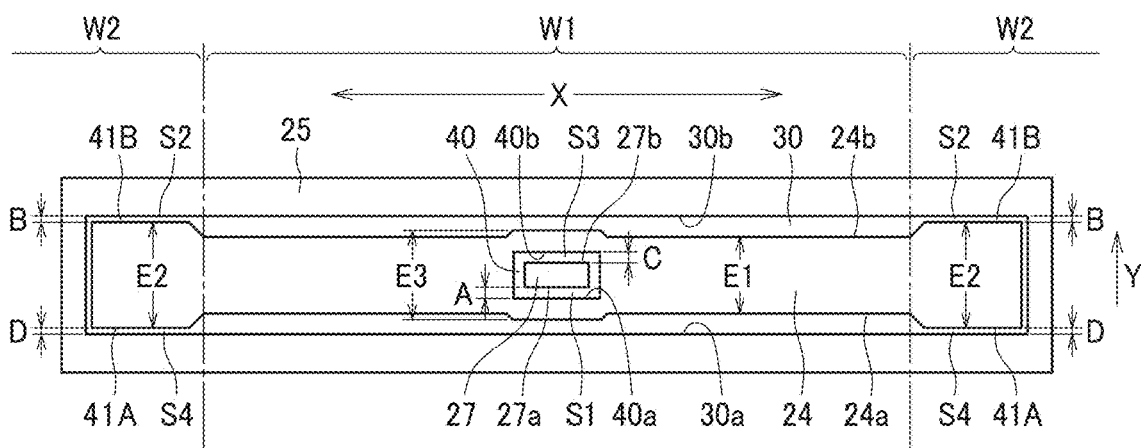
FIG. 12 A plan view showing a heat transfer assisting member, a holder and a temperature sensor according to third disclosure.

FIG. 12 is a plan view showing a high thermal conduction member 24, a holder 25, and a temperature sensor 27 according to a third disclosure.

As shown in FIG. 12, a width E3 (i.e., third portion) of the high thermal conduction member 24 is larger than the width E1 at the other sheet passage region W1 in the third disclosure (E3>E1). The width E3 includes at least the hole portion 40 in the direction X.

Since the contact area of the high thermal conduction member 24 and the heater 23 is smaller, the heat dispersion effect (thermal dispersion ability) of the high thermal conduction member 24 may be lowered at the hole portion 40. Thus, in the third disclosure, the width E3 at the hole portion 40 of the high thermal conduction member 24 is enlarged than the width E1 at the other sheet passage region W1 to suppress the deterioration of the heat dispersion effect of the high thermal conduction member 24 at the hole portion 40. Thereby, the heat dispersion effect with the high thermal conduction member 24 is satisfactorily obtained even at the hole portion 40, and thus the sheet may be uniformly heated.

The positioning of the high thermal conduction member 24 in this case is also done by the contact of the protrusions 41A, 41B and the housing portion 30. Thereby, the enlarged part at the hole portion 40 does not have positioning function. Thus, the width E3 at the hole portion 40 of the high thermal conduction member 24 is smaller than the width E2 at both end portions of the high thermal conduction member 24 in the belt moving direction Y (E3<E2).

As described above, each of the disclosures was explained. In each of the disclosures, the gaps have the relationships of A>B and C>D so as to avoid the contacts of the high thermal conduction member 24 and the temperature sensor 27 for both case when the high thermal conduction member 24 moved in the belt moving direction Y and the opposite belt moving direction Y. However, it does not mean both relationships A>B and C>D must be satisfied, but it may only satisfy just the relationship A>B. That is, since the abnormal temperature rise of the heater 23 likely occurs when the heater 23 is on and the fixing belt 21 is rotated according to the print operation, most of the heater's damage, caused by the abnormal temperature rise of the heater 23, may be prevented by avoiding the contact when the high thermal conduction member 24 is moved in the belt moving direction Y. Thus, it may also be effective by just adopt the relationship A>B to prevent at least the contact of the high thermal conduction member 24 and the temperature sensor 27 when the high thermal conduction member 24 is moved in the belt moving direction Y. Yet, it is more preferable to have both relationships of A>B and C>D to certainly avoid the contacts of the high thermal conduction member 24 and the temperature sensor 27 for higher reliability.

Furthermore, these disclosures also applicable to a configuration including a temperature sensor other than the thermostat. For example, the temperature sensor may be a thermopile, a thermistor, an NC sensor, or the like.

Furthermore, the shape of the hole portion 40 of the high thermal conduction member 24, where the temperature sensor 27 is disposed, may be the hole shape such as a rectangular or circular, or may be such as a notch shape which opens to the belt moving direction Y. Note that it is meaningful to apply the above disclosure for the notch shape which opens in the belt moving direction Y since the facing surface of the hole portion 40 may contact the temperature sensor 27 when the high thermal conduction member 24 is moved in the belt moving direction Y.

Further, the configuration for positioning the high thermal conduction member 24 with respect to the housing portion 30 may be changed as appropriate. For example, a hole portion may be formed on the holder 25, a bending portion may be formed on the high thermal conduction member 24, and inserting the bending portion of the high thermal conduction member 24 into the hole portion of the holder 25 to perform positioning function of the high thermal conduction member 24.

These disclosures are also applicable to other fixing devices different from the fixing device shown in FIG. 2. In the following, examples of the other fixing devices will be exemplified. Some of the same components as described in the fixing device shown in FIG. 2 are denoted by the same reference numerals as those in FIG. 2 and the description thereof may be omitted.

Figure 13:
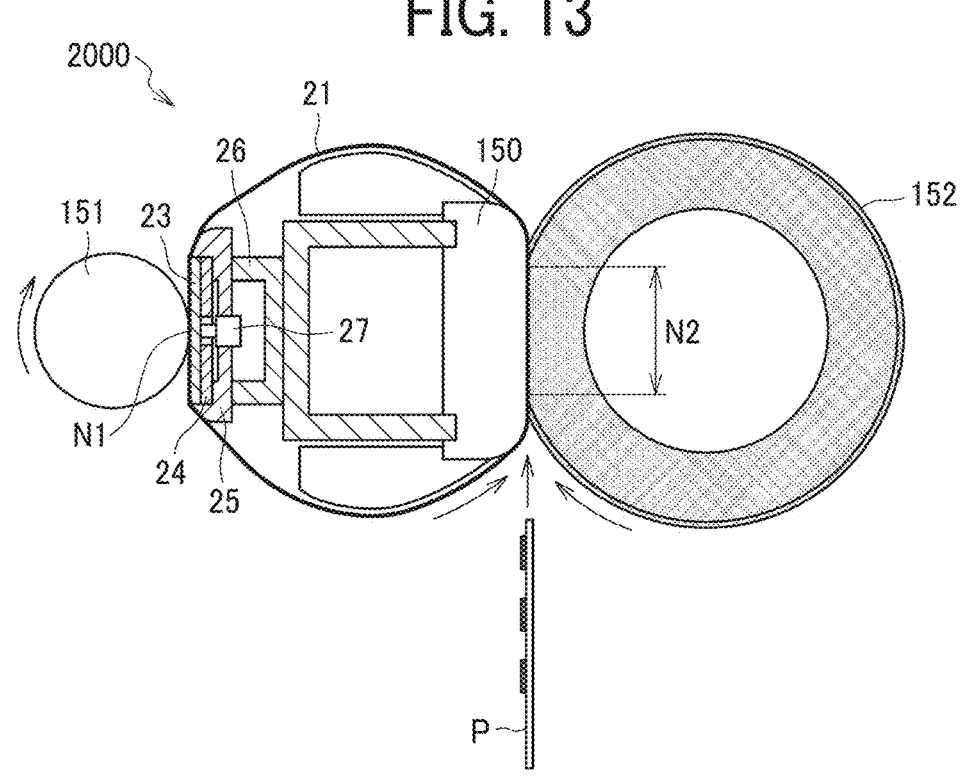
FIG. 13 A diagram showing a configuration of another fixing device to which the present disclosure can be applied.

First, in the fixing device 2000 illustrated in FIG. 13, a heating nip N1 and a fixing nip N2 are provided respectively. Specifically, the first pressing roller 151 is disposed on a side opposite to the second pressing roller 152 side with respect to the fixing belt 21, and each rollers 151, 152 contact with the outer circumferential surface of the fixing belt 21 to form the heating nip N1 and the fixing nip N2. Further, the first pressing roller 151 contacts with the heater 23 via the fixing belt 21 to form the heating nip N1, the second pressing roller 152 contacts with the nip forming member 150 via the fixing belt 21 to form the fixing nip N2. In this case, when the heater 23 generates the heat, the fixing belt 21 is heated at the heating nip N1, then at the fixing nip N2, the heat of the fixing belt 21 is transferred to the unfixed image on the sheet P to fix the image on the sheet P.

Figure 14:
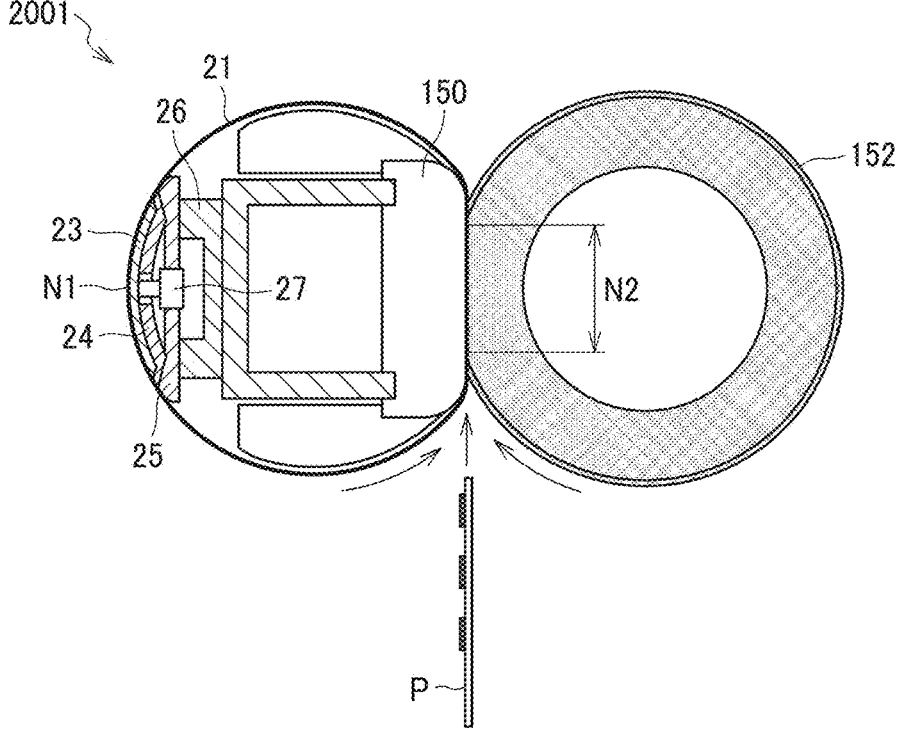
FIG. 14 Another diagram showing a configuration of another fixing device to which the present disclosure can be applied.

Next, in the fixing device 2001 illustrated in FIG. 14, the aforementioned pressing roller 151 is not used, but instead of that, the heater 23 is formed in an arc shape according to the curvature of the fixing belt 21 in order to ensure the circumferential contact length between the fixing belt 21 and the heater 23. Otherwise, the configuration is the same as that of the fixing device 20 shown in FIG. 13. In this case, since the heater 23 is formed in the arc shape according to the curvature of the fixing belt 21, the contact range of the heater 23 and the fixing belt 21 is enlarged in the belt rotating direction to improve heat transfer from the heater 23 to the fixing belt 21.

Figure 15:
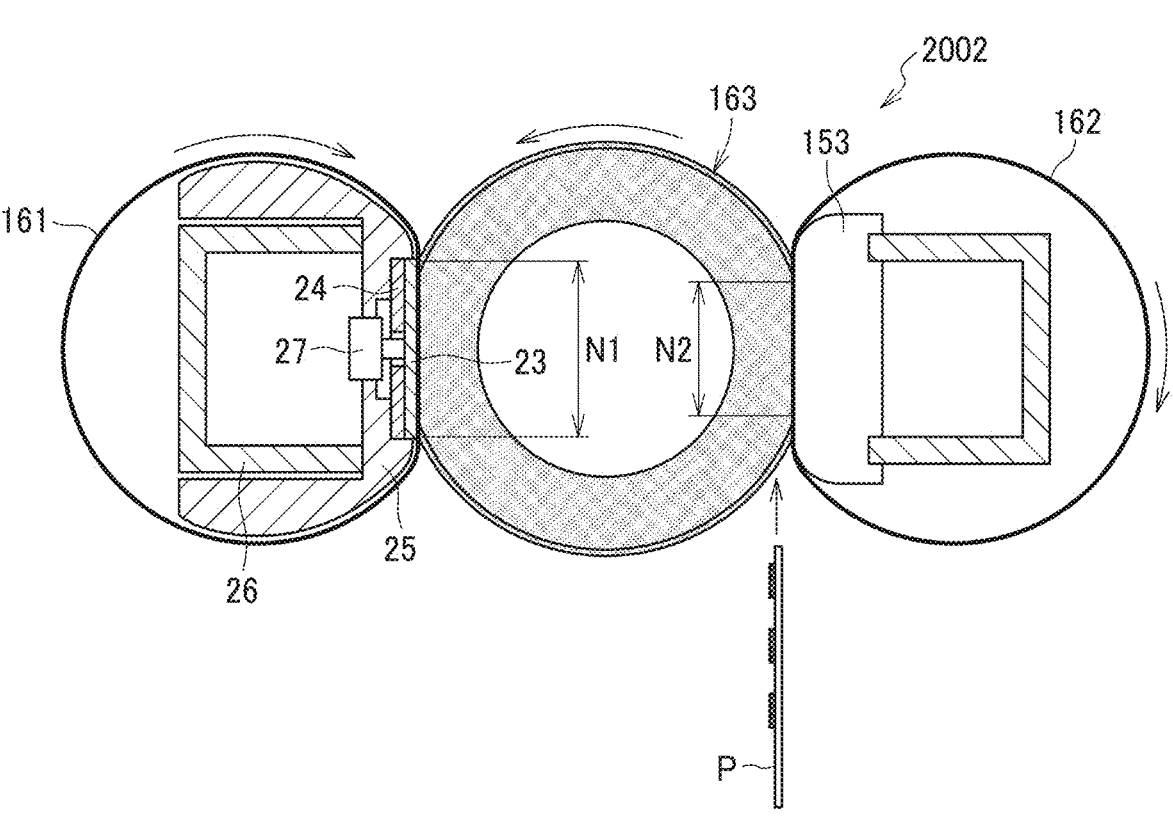
FIG. 15 Another diagram showing a configuration of further another fixing device to which the present disclosure can be applied.

Finally, the fixing device 2002 shown in FIG. 15 includes a heating belt 161, a fuser roller 163, and a pressing belt 162. The heater 23 is arranged inside of the heating belt 161 and the heater 23 contacts the fuser roller 163 via the heating belt 161 to form a heating nip N1. On the other hand, a nip forming member 153 is arranged inside of the pressing belt 162 and the nip forming member 153 contacts the fuser roller 163 to form a fixing nip N2. In this case, when the heater 23 generates the heat, the fuser roller 163 is heated at the heating nip N1, then at the fixing nip N2, the heat of the fuser roller 163 is transferred to the unfixed image on the sheet P to fix the image on the sheet P.

The heating device according to the disclosures are not limited to the fixing device of the image forming apparatus as described above. In other words, the apparatus applicable to the disclosures may be an image forming apparatus including an ink nozzle and drying device to dry ink applied on a sheet, a laminator including at least one of a roller and a belt and configured to thermally presses a film as a covered object to the surface of a sheet such as a paper, or other types of a heating device, for example, a thermocompression device such as a heat sealer that seals a sealing portion of a packaging material with heat and pressure.

To summarize, at least the following aspects are included in the above-described disclosures.

Aspect 1. A heating device (20) comprising:

an endless belt (21) configured to rotate in a first direction (Y);

a heater (23), including a heat generator (31), to heat the endless belt (21);

a temperature detector (27) to detect a temperature of the heater (23);

a high thermal conductor (24) to contact the heater (23), the high thermal conductor (24) includes a hole or a notch (40) in which the temperature detector (27) is disposed;

a holder (25) including a housing portion (30) to hold the heater (23) and the high thermal conductor (24) and restricts a movement of the high thermal conductor (24) in at least at a downstream of the first direction (Y);

a first gap (S1) along the first direction (Y) formed between an upstream surface (27*a*) in the first direction (Y) of the temperature detector (27) and an upstream surface (40*a*) in the first direction (Y) of the hole or the notch (40) of the high thermal conductor (24);

a second gap (S2) along the first direction (Y) formed between a downstream surface (41B) in the first direction (Y) of the high thermal conductor (24) and a downstream surface (30*b*) in the first direction (Y) of the housing portion (30);

wherein a size A of the first gap (S1) and a size B of the second gap (S2) satisfy a relationship of A>B.

Aspect 2. The heating device according to aspect 1, wherein:

the heater (23) contacts an inner surface of the endless belt (21).

Aspect 3. The heating device according to aspect 1 or 2, wherein:

the high thermal conductor (24) contacts with a surface of the heater opposite to a surface contacting the inner surface of the endless belt (21).

Aspect 4. The heating device according to aspect one of 1 to 3, wherein:

the temperature detector (27) contacts with a surface of the heater opposite to the surface contacting the inner surface of the endless belt (21) through the hole or the notch (40).

Aspect 5. The heating device according to aspect one of 1 to 4, wherein:

the first gap (S1) is a minimum gap formed between the upstream surface (27*a*) of the temperature detector (27) and the upstream surface (40*a*) of the hole or the notch (40) of the high thermal conductor (24);

the second gap (S2) is a minimum gap formed between the downstream surface (41B) of the high thermal conductor (24) and the downstream surface (30*b*) of the housing portion (30).

Aspect 6. The heating device according to aspect 5, wherein the downstream surface (41B) of the high thermal conductor (24) and the downstream surface (30*b*) of the housing portion (30) contact each other, when the high thermal conductor (24) moved in the first direction (Y), such that the second gap (S2) is zero;

wherein the first gap (S1) is more than zero when the downstream surface (41B) of the high thermal conductor (24) and the downstream surface (30*b*) of the housing portion (30) contact each other.

Aspect 7. The heating device according to aspect one of 1 to 6, further comprising:

a third gap (S3) along the first direction (Y) formed between an downstream surface (27*b*) in the first direction (Y) of the temperature detector (27) and an downstream surface (40*b*) in the first direction (Y) of the hole or the notch (40) of the high thermal conductor (24);

a fourth gap (S4) along the first direction (Y) formed between a upstream surface (41A/24*a*) in the direction (Y) of the high thermal conductor (24) and a upstream surface (30*a*) in the first direction (Y) of the housing portion (30);

wherein a size C of the third gap (S3) and a size D of the fourth gap (S4) satisfy a relationship of C>D.

Aspect 8. The heating device according to aspect one of 1 to 7, wherein:

the high thermal conductor (24) includes a protrusion (41A) protruding toward the downstream surface (30*b*) of the housing portion (30);

the second gap (S2) is formed between the protrusion (41A) and the downstream surface (30*b*) in the first direction (Y) of the housing portion (30).

Aspect 9. The heating device according to aspect one of 1 to 8, wherein:

the second gap (S2) is formed at an outside of a sheet passage region in a longitudinal direction of the heater (X).

Aspect 10. The heating device according to aspect one of 1 to 9, wherein:

another the second gap (S2) is formed at an outside of a sheet passage region in a longitudinal direction of the heater (X) opposite to the second gap (S2).

Aspect 11. The heating device according to aspect one of 1 to 10, wherein:

the high thermal conductor (24) includes a portion (41A-41B) having a width (E2) wider than a width (E1) of a sheet passage region excluding the portion (41A-41B) in the first direction (Y);

the second gap (S2) is formed between the portion (41A-41B) and the downstream surface (30b) in the first direction (Y) of the housing portion (30).

Aspect 12. The heating device according to aspect one of 1 to 11, wherein: (SEE FIG. 9)

the housing portion (30) includes a portion (32A-32B) having a width (F2) narrower than a width (F1) of a sheet passage region excluding the portion (32A-32B) in the first direction (Y);

the second gap (S2) is formed between the downstream surface (41B) in the first direction (Y) of the high thermal conductor (24) and the portion (32A-32B).

Aspect 13. The heating device according to aspect one of 1 to 12, wherein: (SEE FIG. 12)

the high thermal conductor (24) to contact the heater (23), the high thermal conductor (24) includes the hole (40) in which the temperature detector (27) is disposed;

the high thermal conductor (24) includes a wide portion having a width (E3) wider than a width (E1) of a sheet passage region excluding the portion (41A-41B) and the wide portion in the first direction (Y).

Aspect 14. The heating device according to aspect 11, wherein: (SEE FIG. 12)

the high thermal conductor (24) to contact the heater (23), the high thermal conductor (24) includes the hole (40) in which the temperature detector (27) is disposed;

the high thermal conductor (24) includes a wide portion having a width (E3) wider than a width (E1) of a sheet passage region excluding the portion (41A-41B) and the wide portion in the first direction (Y).

Aspect 15. The heating device according to aspect 14, wherein: (SEE FIG. 12)

the width (E3) of the wide portion is smaller than the width (E2) of the portion in the first direction (Y).

Aspect 16. The heating device according to aspect one of 1 to 5, wherein:

the high thermal conductor (24) includes a portion (41A-41B), on one side of a longitudinal direction of the heater (X), having a width (E2) wider than a width (E1) of a sheet passage region excluding the portion (41A-41B) in the first direction (Y);

the housing portion (30) includes a portion (32A-32B), on other side opposite to the one side of a longitudinal direction of the heater (X), having a width (F2) narrower than a width (F1) of a sheet passage region excluding the portion (32A-32B) in the first direction (Y);

the second gap (S2) is formed between the portion (41A-41B) and the downstream surface (30b) in the first direction (Y) of the housing portion (30) or/and between the downstream surface (41B) in the first direction (Y) of the high thermal conductor (24) and the portion (32A-32B).

Aspect 17. An image forming apparatus comprising a photoconductor and the heating device according to aspect one of 1 to 16 as a fixing device.

Aspect 18. An image forming apparatus comprising an ink nozzle and the heating device according to aspect one of 1 to 16 as a drying device.

Aspect 19. A laminator comprising a transfer mechanism including at least one of a roller and a belt and the heating device according to aspect one of 1 to 16.

Aspect 20. A thermocompression device comprising a transfer mechanism including at least one of a roller and a belt and the heating device according to aspect one of 1 to 16.

What is claimed is:

1. A heating device comprising:

an endless belt configured to rotate in a first direction;

a heater including a heat generator to heat the endless belt;

a temperature detector to detect a temperature of the heater;

a thermal conductor contacting the heater, the thermal conductor including a hole or a notch in which the temperature detector is disposed;

a holder including a housing portion to hold the heater and the thermal conductor and restrict a movement of the thermal conductor in at least downstream of the first direction;

a first gap between an upstream surface in the first direction of the temperature detector and an upstream surface in the first direction of the hole or the notch of the thermal conductor; and a second gap between a downstream surface in the first direction of the thermal conductor and a downstream surface in the first direction of the housing portion, wherein a size A of the first gap and a size B of the second gap satisfy a relationship of A>B, and wherein a thermal conductivity of the thermal conductor is higher than a thermal conductivity of the holder.

2. The heating device according to claim 1, wherein:

the heater contacts an inner surface of the endless belt.

3. The heating device according to claim 2, wherein:

the thermal conductor contacts a first surface of the heater opposite to a second surface of the heater contacting the inner surface of the endless belt.

4. The heating device according to claim 3, wherein;

the temperature detector contacts the first surface of the heater through the hole or the notch.

5. The heating device according to claim 1, wherein:

the first gap is a minimum gap between the upstream surface of the temperature detector and the upstream surface of the hole or the notch of the thermal conductor, and the second gap is a minimum gap between the downstream surface of the thermal conductor and the downstream surface of the housing portion.

6. The heating device according to claim 5, wherein;

when the downstream surface of the thermal conductor and the downstream surface of the housing portion contact each other, the second gap is zero, and the first gap is greater than zero.

7. The heating device according to claim 1, further comprising:

a third gap between a downstream surface in the first direction of the temperature detector and a downstream surface in the first direction of the hole or the notch of the thermal conductor; and a fourth gap along the first direction between an upstream surface in the direction of the thermal conductor and a upstream surface in the first direction of the housing portion, wherein a size C of the third gap and a size D of the fourth gap satisfy a relationship of C>D.

8. The heating device according to claim 5, wherein:

the thermal conductor includes a protrusion protruding toward the downstream surface of the housing portion, and the second gap is between the protrusion and the downstream surface of the housing portion in the first direction.

9. The heating device according to claim 5, wherein:

the second gap is outside of a sheet passage region in a longitudinal direction of the heater.

10. The heating device according to claim 8, wherein:

the second gap is outside of a sheet passage region in a longitudinal direction of the heater.

11. The heating device according to claim 5, wherein:

the thermal conductor includes:

a first portion at longitudinal ends of the thermal conductor outside of a sheet passage region; and a second portion excluding the first portion, and a width in the first direction of the first portion is greater than a width in the first direction of the second portion, and the second gap is between the first portion and the downstream surface of the housing portion in the first direction of the housing portion.

12. The heating device according to claim 1, wherein:

the housing portion includes a protrusion having a width narrower than a width of a sheet passage region excluding the protrusion of the housing portion in the first direction, and the second gap is between the downstream surface of the thermal conductor and the protrusion of the housing portion in the first direction.

13. The heating device according to claim 1, wherein:

the thermal conductor includes:

a first portion at longitudinal ends of the thermal conductor outside of a sheet passage region; and a second portion excluding the first portion, a width in the first direction of the first portion is greater than a width in the first direction of the second portion, the thermal conductor contacts the heater, the thermal conductor includes a third portion having a width greater than the width of the second portion, the second portion excluding the third portion, the thermal conductor including the hole, and the third portion surrounding the hole of the thermal conductor.

14. The heating device according to claim 11, wherein:

the thermal conductor contacts the heater, the thermal conductor includes a third portion having a width greater than the width of the second portion, the second portion excluding the third portion, the thermal conductor including the hole, and the third portion surrounding the hole of the thermal conductor.

15. The heating device according to claim 14, wherein:

the width of the third portion is less than the width of the first portion in the first direction.

16. The heating device according to claim 5, wherein:

the thermal conductor includes a first portion on a first side of a longitudinal direction of the heater, having a width greater than a width of a second portion of the thermal conductor excluding the first portion, the housing portion includes a protrusion on a second side opposite to the first side of the heater, the protrusion of the housing portion having a width narrower than a width of a sheet passage region of the housing portion in the first direction, and the second gap is between the first portion of the thermal conductor and the downstream surface of the housing portion in the first direction or/and between the downstream surface of the thermal conductor and the protrusion of the housing portion in the first direction.

17. An image forming apparatus comprising:

a photoconductor; and the heating device according to claim 1 as a fixing device.

18. An image forming apparatus comprising:

an ink nozzle; and the heating device according to claim 1 as a drying device.

19. A laminator comprising:

a transfer mechanism, the transfer mechanism including at least one of a roller and a belt; and the heating device according to claim 1.

20. A thermocompression apparatus comprising:

a transfer mechanism, the transfer mechanism including at least one of a roller and a belt; and the heating device according to claim 1.

* * * * *